(12) United States Patent
Jafari et al.

(10) Patent No.: US 11,729,170 B2
(45) Date of Patent: Aug. 15, 2023

(54) EFFICIENT AND SECURE COMMUNICATION BETWEEN COMPUTATIONAL INSTANCES OF A REMOTE NETWORK MANAGEMENT PLATFORM

(71) Applicant: ServiceNow, Inc., Santa Clara, CA (US)

(72) Inventors: Amir Vakili Jafari, Los Gatos, CA (US); Colby Andrew Blakeman, San Jose, CA (US); Meenakshi Tripathy, Redwood City, CA (US); Praveen Minnikaran Damodaran, Hyderabad (IL); Ryan Meonske, San Jose, CA (US); Bharath Soundararajan, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 745 days.

(21) Appl. No.: 16/359,797

(22) Filed: Mar. 20, 2019

(65) Prior Publication Data
US 2020/0304502 A1 Sep. 24, 2020

(51) Int. Cl.
*H04L 9/40* (2022.01)
*H04L 41/00* (2022.01)
*G06F 16/23* (2019.01)

(52) U.S. Cl.
CPC .......... *H04L 63/10* (2013.01); *G06F 16/2379* (2019.01); *H04L 41/20* (2013.01)

(58) Field of Classification Search
CPC ...... H04L 63/10; H04L 41/20; G06F 16/2379
See application file for complete search history.

(56) References Cited

U.S. PATENT DOCUMENTS

| | | | |
|---|---|---|---|
| 7,020,706 B2 | 3/2006 | Cates | |
| 7,716,353 B2 | 5/2010 | Golovinsky | |
| 7,769,718 B2 | 8/2010 | Murley | |
| 7,925,981 B2 | 4/2011 | Pourheidar | |
| 8,402,127 B2 | 3/2013 | Solin | |
| 8,612,408 B2 | 12/2013 | Trinon | |
| 8,832,652 B2 | 9/2014 | Mueller | |
| 9,065,783 B2 | 6/2015 | Ding | |
| 9,098,322 B2 | 8/2015 | Apte | |
| 9,122,552 B2 | 9/2015 | Whitney | |
| 9,182,951 B1 * | 11/2015 | Ormerod | ............... G06F 9/4494 |

(Continued)

*Primary Examiner* — Emmanuel L Moise
*Assistant Examiner* — Xiang Yu
(74) *Attorney, Agent, or Firm* — Fletcher Yoder PC

(57) ABSTRACT

A remote network management platform may include a provider computing instance, a recipient computing instance, and a neutral computing instance including persistent storage that defines a table and fields therein, and where the neutral computing instance is configured to: (i) receive, by way of a first software interface, data from the provider computing instance, where the data is an update to a field within the table; (ii) validate that the provider computing instance is permitted to update the field; (iii) write a representation of the data to the field; (iv) receive, by way of a second software interface, a request from the recipient computing instance for the data; (v) validate that the recipient computing instance is permitted to access the field; and (vi) transmit the data as stored in the field to the recipient computing instance.

20 Claims, 10 Drawing Sheets

(56) References Cited

U.S. PATENT DOCUMENTS

| | | |
|---|---|---|
| 9,317,327 B2 | 4/2016 | Apte |
| 9,363,252 B2 | 6/2016 | Mueller |
| 9,535,737 B2 | 1/2017 | Joy |
| 9,654,473 B2 | 5/2017 | Miller |
| 9,654,833 B2 | 5/2017 | Mueller |
| 9,766,935 B2 | 9/2017 | Kelkar |
| 9,805,322 B2 | 10/2017 | Kelkar |
| 2012/0331000 A1* | 12/2012 | Mehra ................. G06F 16/2358 707/769 |
| 2013/0173684 A1* | 7/2013 | Kuchhal .................. G06F 8/60 709/227 |
| 2018/0197122 A1* | 7/2018 | de Kadt ................. G06Q 10/00 |
| 2019/0087239 A1* | 3/2019 | Adibowo ............... G06N 20/20 |
| 2019/0114337 A1* | 4/2019 | George ................. G06F 16/902 |
| 2019/0342079 A1* | 11/2019 | Rudzitis ................. H04L 9/083 |

\* cited by examiner

EFFICIENT AND SECURE COMMUNICATION BETWEEN COMPUTATIONAL INSTANCES OF A REMOTE NETWORK MANAGEMENT PLATFORM

BACKGROUND

A remote network management platform may include a cloud-based computing system located in one or more data centers, and may contain multiple computational instances. Each computational instance may include one or more computing devices and one or more databases dedicated to a particular entity (e.g., an enterprise, organization, or individual). Such a computational instance may provide a private and secure web-based mechanism to store information (e.g., configuration items) related to a managed network of the entity, as well as to carry out data-driven workflows that assist the entity with its operations.

SUMMARY

Multi-instance architectures, such as the one described above, are technically advantageous for numerous reasons, including but not limited to the physical separation of data between the instances. In other words, a computational instance dedicated to an entity may be both logically and physically separate from other computational instances dedicated to other entities. For example, the computing devices and databases within a computational instance may only be accessed by authorized users of its entity, and do not co-mingle data or computational resources with other computational instances. Thus, each entity can rely on its computational instance(s) to maintain private and/or sensitive data in a secure fashion.

Nonetheless, there are scenarios in which one such entity might want to share information stored in its computational instance with other entities. In one example, a supplier may provide selected catalog information (e.g., lists of products and/or services as well as associated prices), to its customers. When all of these entities have their own computational instances, the supplier would have to provide the same information to each customer's computational instance for integration into that customer's computer-mediated purchasing or finance operations. This leads to inefficiencies with having to provide the same information, in an out of band fashion (e.g., in a separate file or files, or manually) to potentially dozens or hundreds of computational instances. Furthermore, when this information is updated, it would need to be provided again to each computational instance. Thus, the risk that at least some entities are out of date grows with the number of computational instances that are to be updated.

In another example, service information may be shared anonymously between computational instances. In these cases, multiple entities may voluntarily opt in to sharing information related to one or more vendors that provide or can provide products and/or services to the multiple entities. In embodiments, the vendors may be evaluated based on how well they adhere to pre-defined service level agreements (SLAs), their mean time to resolution (MTTR) metrics, overall availability, customer survey feedback, and/or other measurements or assessments of product or service quality. Each entity may locally store, within its own computational instance, such measurements and assessments, and may choose to anonymously share this information with other entities by way of their respective computational instances.

As a consequence, the multi-instance remote network management platform architecture can be extended and utilized for various types of data sharing between computational instances. While it is possible for this sharing to take place directly between computational instances, the remote network management platform can offer a neutral instance to serve as an intermediary for the sharing. The neutral instance may be a central instance that is operated by the remote network management platform and not dedicated to any particular entity that uses the platform.

This allows the use of a producer/consumer (provider/recipient) model of data transfer—namely, one or more producer (provider) instances securely publish information to a particular location of the neutral instance. This location may be, for example, accessible by way of a uniform resource locator (URL). One or more consumer (recipient) instances may subscribe to information published at the particular location. This subscription may entail the consumer instances agreeing to be notified by the neutral instance when the published information is updated or new information is published at the location. Thus, consumer instances may be triggered to obtain the updated information from the location. Access to the information can occur in various ways, e.g., by way of representational state transfer (REST) or simple object access protocol (SOAP) interfaces.

In this way, the architecture and utility of a remote network management platform can be improved to support secure, private, direct or indirect inter-instance communication. In doing so, entities making use of computational instances can employ information otherwise only available to other such entities and thus avoid redundant data collection and analysis procedures.

Accordingly, a first example embodiment may involve a remote network management platform that includes: a provider computing instance disposed upon hardware dedicated to a first entity; a recipient computing instance disposed upon hardware dedicated to a second entity; and a neutral computing instance including one or more processors and persistent storage, where the neutral computing instance is disposed upon hardware that is dedicated to neither the first entity nor the second entity, where the persistent storage defines a table and fields therein, and where the neutral computing instance is configured to: (i) receive, by way of a first software interface, data from the provider computing instance, where the first software interface or the data indicates that the data is an update to a field within the table, (ii) validate that the provider computing instance is permitted to update the field, (iii) possibly in response to validating that the provider computing instance is permitted to update the field, write a representation of the data to the field, (iv) receive, by way of a second software interface, a request from the recipient computing instance for the data as stored in the field, (v) validate that the recipient computing instance is permitted to access the field, and (vi) possibly in response to validating that the recipient computing instance is permitted to access the field, transmit the data as stored in the field to the recipient computing instance.

A second example embodiment may involve receiving, by way of a first software interface on a neutral computing instance, data from a provider computing instance, where the first software interface or the data indicates that the data is an update to a field within the table. The second example embodiment may further involve validating, by the neutral computing instance, that the provider computing instance is permitted to update the field. The second example embodiment may further involve, possibly in response to validating that the provider computing instance is permitted to update the field, writing, by the neutral computing instance, a representation of the data to the field. The second example embodiment may further involve receiving, by way of a second software interface on the neutral computing instance, a request from the recipient computing instance for the data as stored in the field. The second example embodiment may further involve validating, by the neutral computing instance, that the recipient computing instance is permitted to access the field. The second example embodiment may further involve, possibly in response to validating that the recipient computing instance is permitted to access the field, transmitting, by the neutral computing instance, the data as stored in the field to the recipient computing instance.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
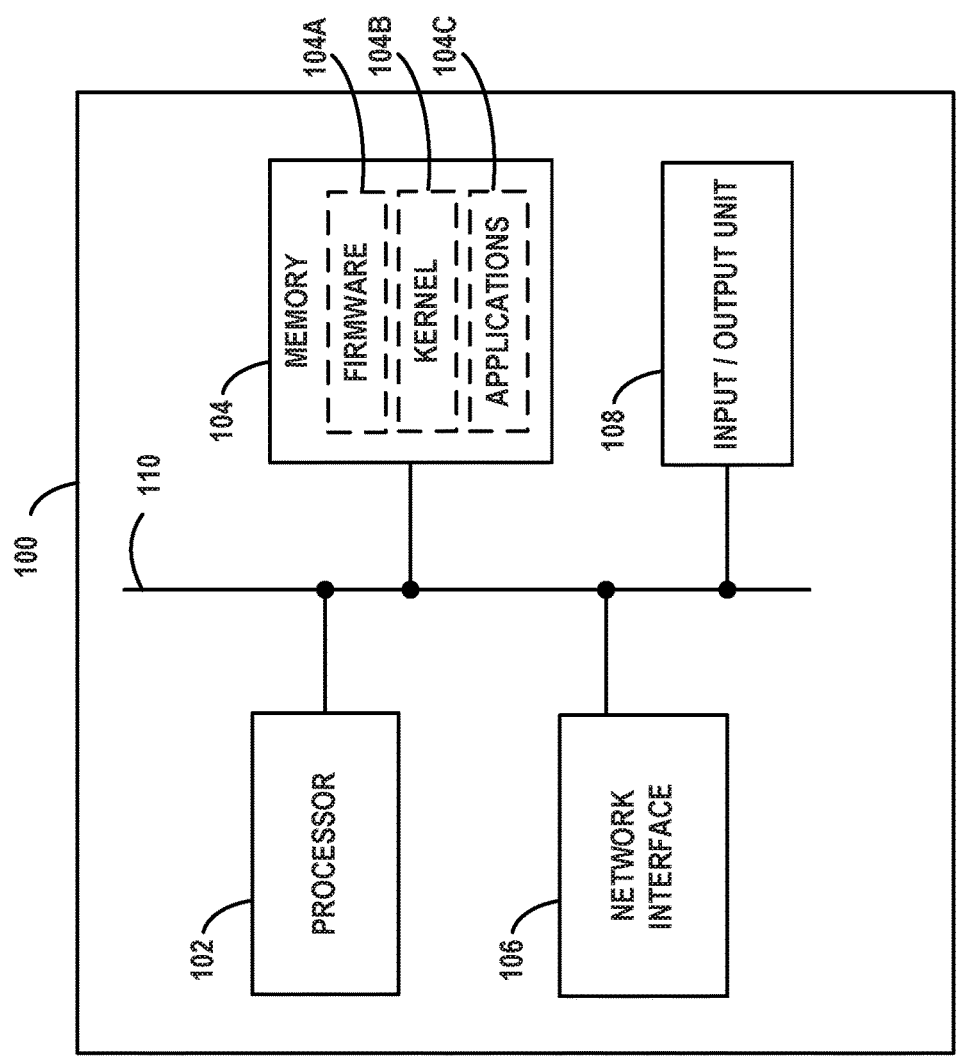
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
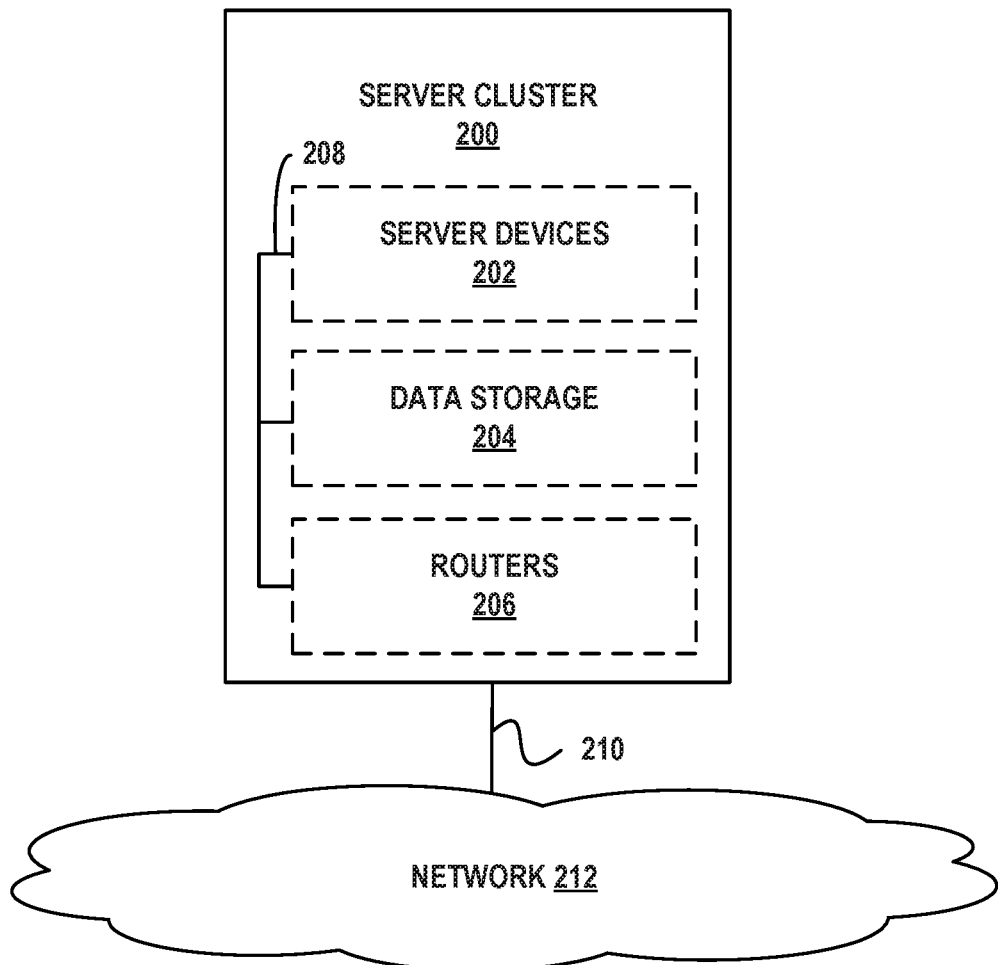
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
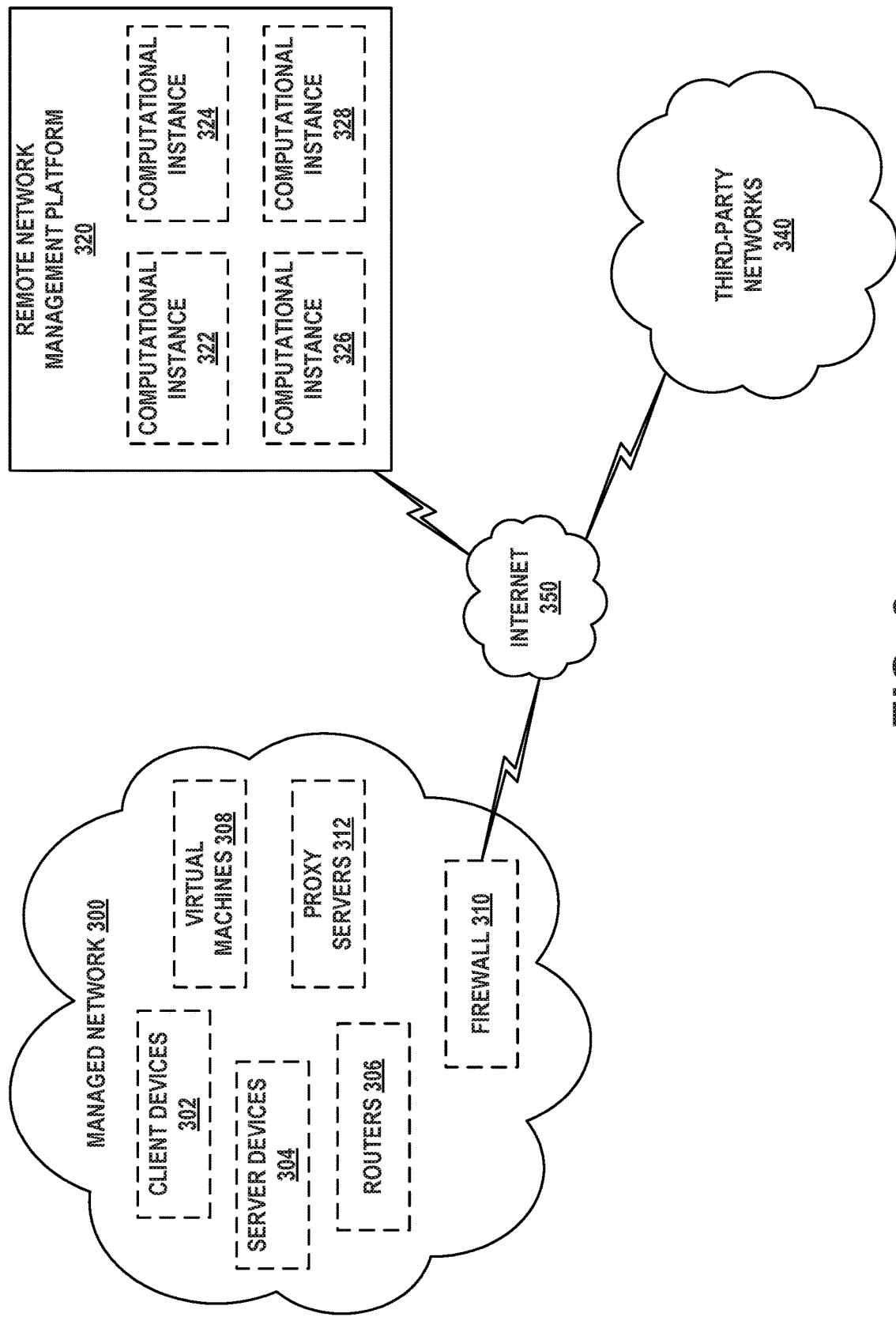
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
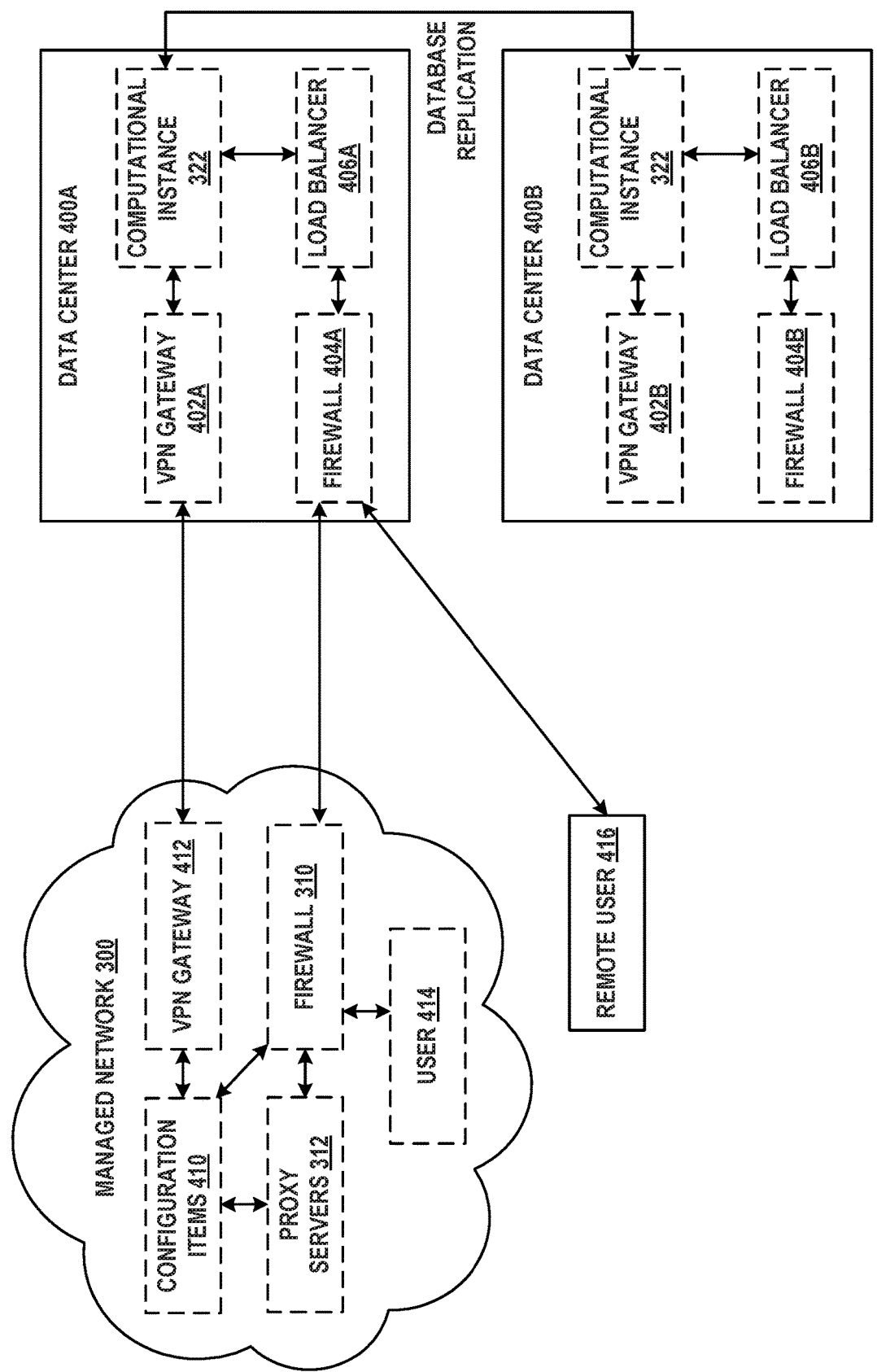
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
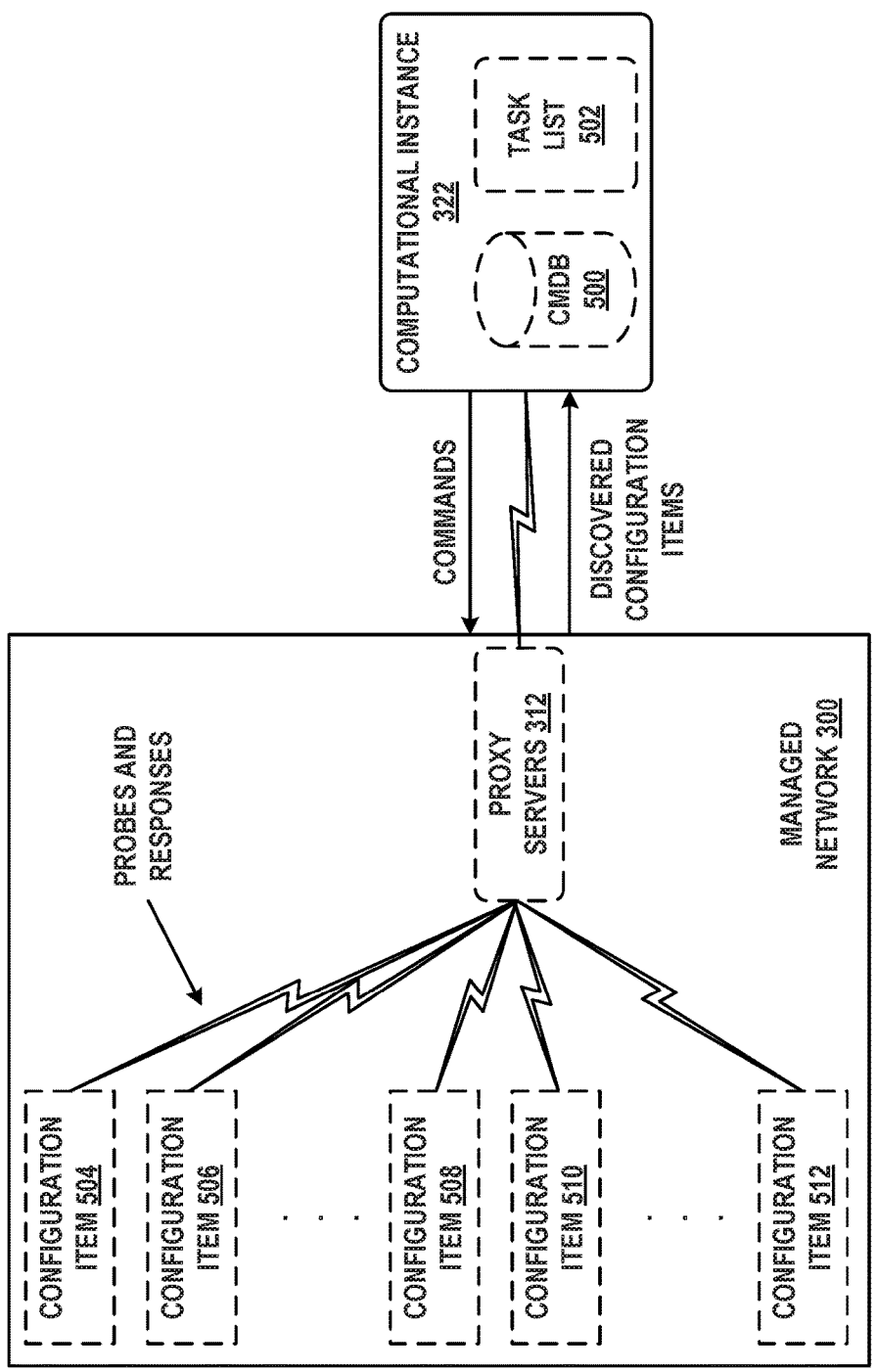
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
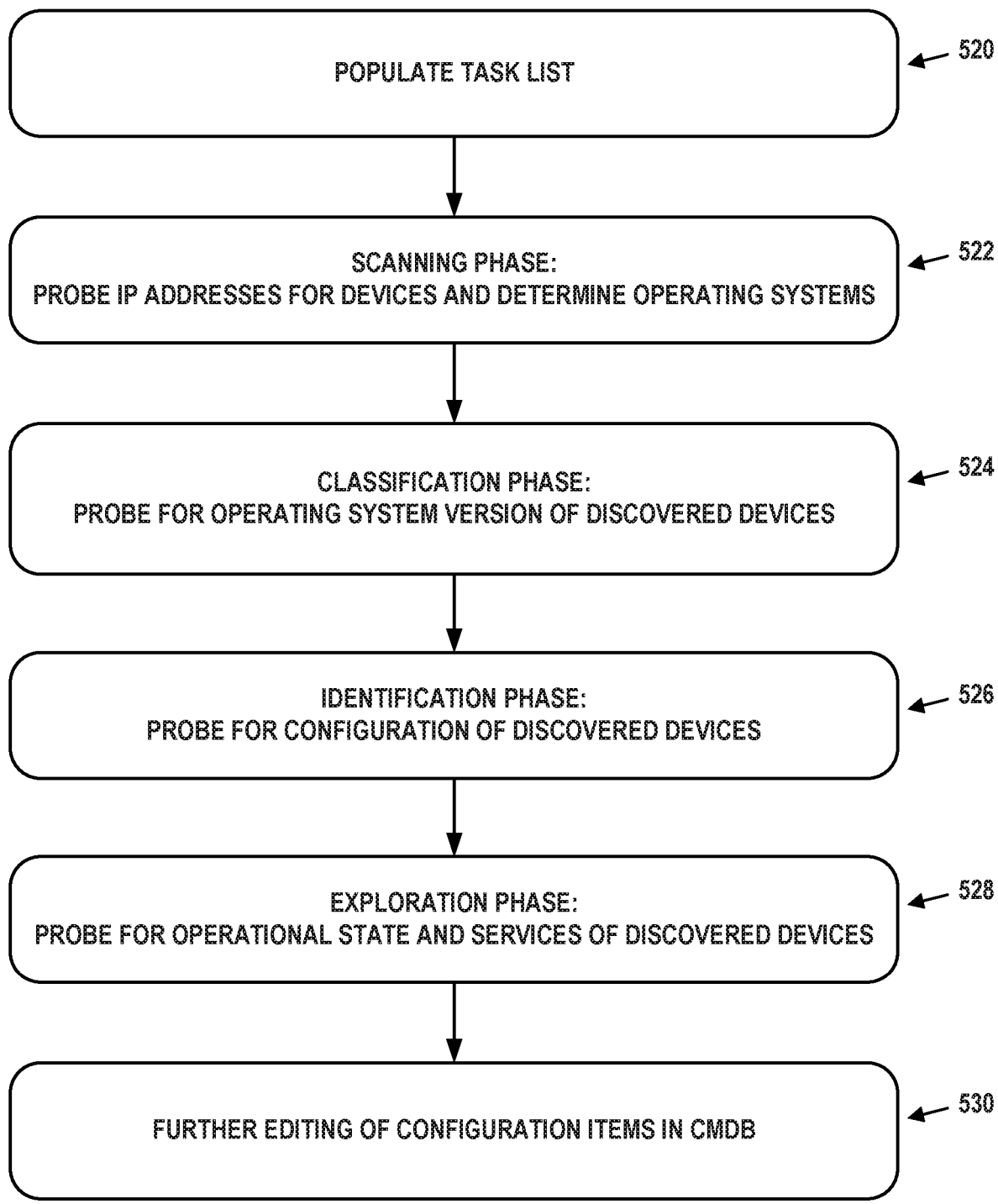
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Architectures to Support Information Sharing

As noted previously, an entity utilizing a computational instance might find it advantageous to provide certain information stored therein to computational instances of other entities. For example, a provider (e.g., an entity that is a supplier of goods and/or services), as well as a number of its customers (e.g., entities that are recipients of the goods and/or services), may use respective computational instances of a remote network management platform. The provider may have a catalog, database, list, or other form of information related to its supported goods and/or services, as well as associated delivery options, manuals/documentation, and policies. This information may include, for each discrete good and/or service offered, entries containing descriptions thereof, pricing data, availability data, and/or other data.

TABLE 1

| Vendor | Model | Description | Availability | Price |
|---|---|---|---|---|
| Technodyne | TD1200 | 2.6 GHz processor, 8 GB RAM, 15" display | Current | $699.99 |
| Technodyne | TD1400 | 3.0 GHz processor, 12 GB RAM, 17" display | May 2019 | $799.99 |
| Cyberdyne | CD90Z | 3.2 GHz processor, 8 GB RAM, 15" display | Current | $650.00 |

Conventionally, this information may be provided to each recipient by way of a file, database update, or manual entry. In other words, the provider might make the information available on a web site, by way of email, or might provide the information in other ways to the recipients. Often, this information is the same for all recipients.

As a concrete example, suppose that the provider has a catalog of laptop computers that it can supply to customers. This catalog may change monthly to reflect new models being added, old models being removed, updated descriptions, and/or updated prices. Table 1 depicts such a catalog. For each laptop, its vendor, model number, description, availability, and price are provided. Thus, recipients can integrate the catalog into their own equipment ordering and upgrade workflows, such as those supported by the web interfaces of these recipients' respective computational instances.

A challenge for the provider is to make sure that its customers have the most up to date version of the catalog. Otherwise, the customers might attempt to order laptops that are discontinued or out of stock, or may attempt to place an order at the wrong price. Thus, the provider may find it desirable to share the catalog with each of its customers (and potential customers) on a frequent basis. In some cases, for large catalogs with offerings that change rapidly, this may be one or more times per day or per week. And some providers may have hundreds or thousands of customers to keep up to date.

Thus, conventional methods of sharing such information do not scale in a reliable fashion. It is likely that, at any point in time, a significant portion of the intended recipients of the information either are not aware of updates to the information, have not checked whether updates are available, or have not integrated the updates into their ordering workflow or database.

As a consequence of these technical challenges, it is desirable to be able to share provider information between the provider's computational instance and recipients' computational instances without violating any data security or privacy mechanisms put in place by any of these entities or the remote network management platform. In some (but not all) of the embodiments herein, direct communication between computational instances dedicated to the provider and a recipient may be considered such a violation due to the risk of proprietary information leakage from one computational instance to another.

Figure 6A:
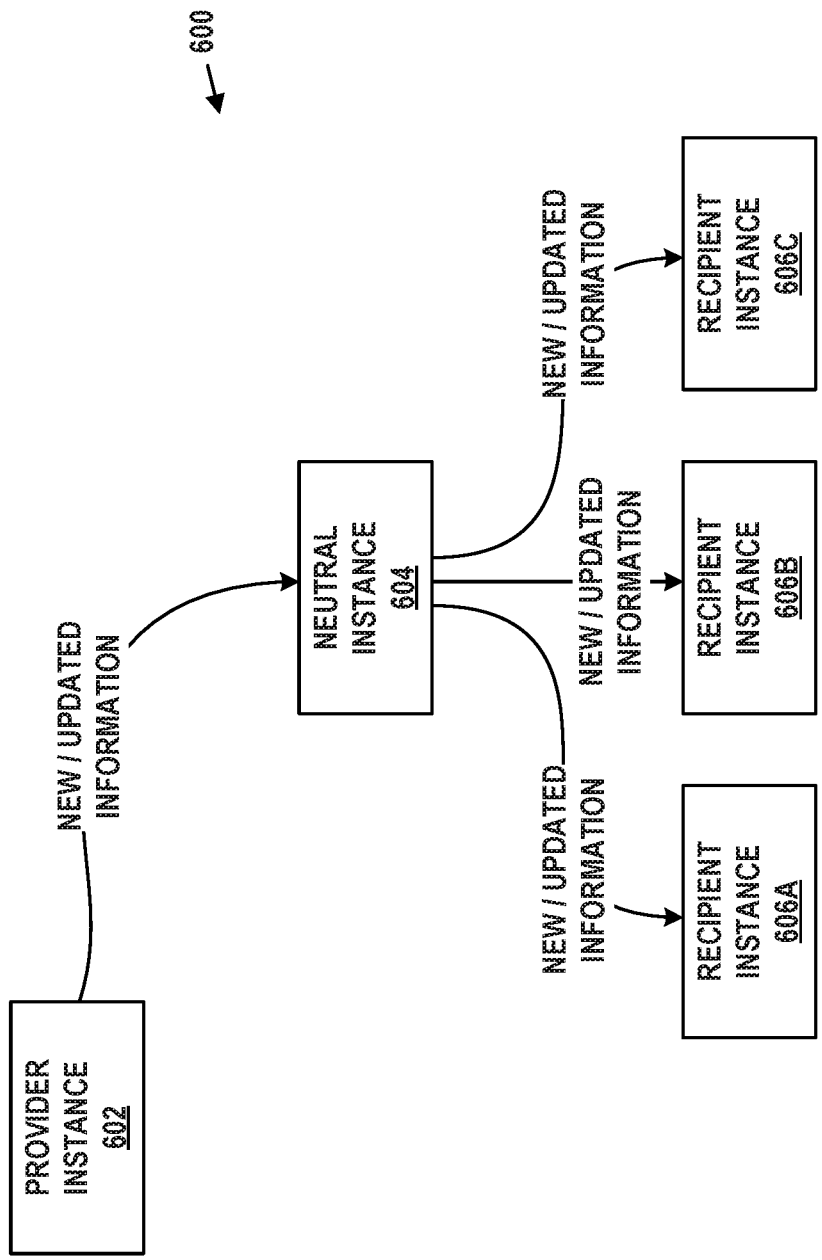
FIG. 6A depicts an architecture for sharing information between computational instances, in accordance with example embodiments.

FIG. 6A depicts a remote network management architecture 600 that can be used to efficiently share the information as often as needed while addressing potential security and privacy concerns. In particular, all of the computational instances are assumed to be contained within a single remote network management platform, though they may be distributed across multiple data centers.

Architecture 600 includes provider instance 602, neutral instance 604, and recipient instances 606A, 606B, 606C. Provider instance 602 may be a computational instance dedicated to a provider of goods and/or services, such as in the laptop example above. Neutral instance 604 may be a computational instance preferably operated and administrated by the operator of the remote network management platform. Recipient instances 606A, 606B, 606C may be respectively dedicated to entities (e.g., companies or other organizations) that make use of the goods and/or services of the provider.

Notably, provider instance 602 and recipient instances 606A, 606B, 606C are each configured to communicate with neutral instance 604 rather than directly with one another. In other arrangements such direct communication may be possible. Nonetheless, neutral instance 604 may support interfaces through which provider instance 602 and recipient instances 606A, 606B, 606C can submit data and obtain data while adhering to authentication and authorization policies while doing so.

In some possible examples, provider instance 602 may transmit information (e.g., a representation of a catalog, database, or list as discussed above) to neutral instance 604. This transmission may be by way of an application programming interface (API) supported by neutral instance 604, such as a REST interface, SOAP interface, or some other type of interface.

To illustrate in more detail, consider a REST interface that may be supported by neutral instance 604. This interface may allow provider instance 602 to add, read, remove, and update information stored in neutral instance 604 by way of HTTP POST, GET, DELETE, and PUT commands, respectively. Neutral instance 604 may contain a database with tables and fields configured to store the information in a structured format, where the REST interface provides a controlled portal with which provider instance 602 can write to and read from the database.

For example, the information in Table 1 may be arranged in a corresponding database table within neutral instance 604. This table may include fields for the vendor, model, descriptions, availability, and price of laptops, and each entry in the table may represent a particular model of laptop from a particular vendor. Provider instance 602 may create such a table in neutral instance 604 by transmitting an HTTP POST command to neutral instance 604 specifying the structure of the table in its payload. Once the table is created, provider instance 602 may be able to remove the table or entries therein by transmitting an HTTP DELETE command to neutral instance 604. Further, provider instance 602 may be able to update the table or entries therein by transmitting an HTTP PUT command to neutral instance 604.

In each of these commands transmitted by way of the REST interface on neutral instance 604, the payload may be encoded in various ways. In some embodiments, JavaScript Object Notation (JSON) may be used, but other structured data formats such as eXtensible Markup Language (XML) or YAML Ain't Markup Language (YAML) could be employed instead.

The REST interface may be implemented by way of one or more URLs accessible on neutral instance 604. These URLs may be arranged so that they contain enough specificity to unambiguously identify the resource of neutral instance 604 that the HTTP command is attempting to access. For example, the URL http://www.ne1.example.com/db09/rest/laptops/ could be used to access the database table in general, while the URL http://www.ne1.example.com/db09/rest/laptops/2 could be used to access the second entry in the database table, and the URL http://www.ne1.example.com/db09/rest/laptops/2/price could be used to access the price of the second entry in the database table. Other examples are possible.

Thus, provider instance 602 may use these URLs with HTTP commands to add, read, remove, and update information stored in neutral instance 604. In order to secure such transactions so that only entities associated with provider instance 602 can do so, the HTTP headers may include digest (HMAC) based authentication. Alternatively, OAUTH may be used for such transactions.

In a similar fashion, recipient instances 606A, 606B, 606C may be able to use these REST APIs (or any other API that is available) to read the information stored in the table of neutral instance 604. In other words, recipient instances 606A, 606B, 606C may be granted read-only access to the information (e.g., by way of HTTP GET commands) and thus might not be able to change this information.

Recipient instances 606A, 606B, 606C may use the same URLs as provider instance 602 to access the information. But in some embodiments, recipient instances 606A, 606B, 606C may use different URLs. It is possible that each recipient instance may access the information by way of its own custom URL or groups of recipient instances (e.g., where each group of these instances are associated with enterprises from respective industries) may share group-specific URLs. In this way, different recipient instance or groups thereof may be granted access to different sets of tables, fields, entries, or other data in neutral instance 604.

For example, one URL may be for entities in the automotive industry, another URL may be for entities in the IT industry, and so on.

In some embodiments, a local adjustment to the information obtained from neutral instance 604 may be applied by one or more of recipient instances 606A, 606B, 606C. For example, if the entity associated with recipient instance 606B has negotiated a 10% discount in price for all laptops, recipient instance 606B may apply this discount after receiving the list prices from neutral instance 604. Then, the discounted prices may be stored in the database and used with the workflows of recipient instance 606B.

Although FIG. 6A implies that the flow of information is unidirectional (e.g., from provider instance 602 to neutral instance 604 and then to one or more of recipient instances 606A, 606B, 606C), this need not be the case. In some embodiments, information may flow from one or more of recipient instances 606A, 606B, 606C to provider instance 602 by way of neutral instance 604. For example, recipient instance 606A may transmit a representation of a purchase order, contract, or other information to provider instance 602. The above security mechanisms to prohibit non-parties to the transaction from accessing it by way of neutral instance 604 may apply in this case as well.

In another example architecture, product and/or service quality information may be shared anonymously between computational instances. In these cases, multiple product and/or service recipient entities may voluntarily opt in to sharing information related to one or more vendor entities that provide or can provide products and/or services. These vendor entities may be evaluated based on how well they adhere to pre-defined SLAs, their MTTR metrics, overall availability, customer survey feedback, and/or other measurements or assessments of product or service quality. Each recipient entity may locally store, within its own computational instance, such measurements and assessments, and may choose to anonymously share this information with other entities by way of their respective computational instances. In this way, a "network of consumers" may be developed for sharing crowd-sourced information.

Figure 6B:
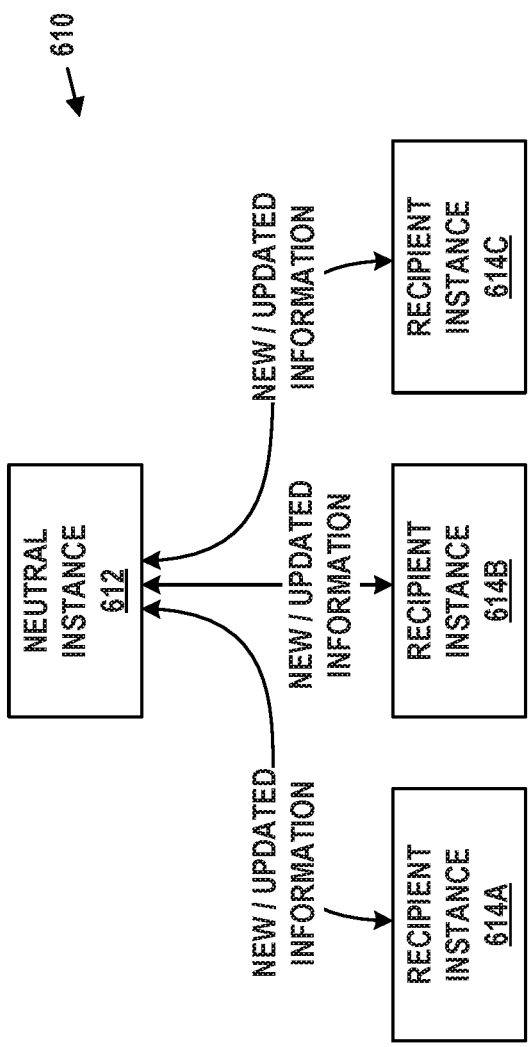
FIG. 6B depicts another architecture for sharing information between computational instances, in accordance with example embodiments.

Such an arrangement is depicted in FIG. 6B as architecture 610. Therein, neutral instance 612 is disposed within a remote network management platform. Like neutral instance 604, neutral instance 612 may be a computational instance preferably operated and administrated by the operator of the remote network management platform. Recipient instances 614A, 614B, 614C are also disposed within the remote network management platform. Like recipient instances 606A, 606B, 606C, recipient instances 614A, 614B, 614C may be respectively dedicated to entities (e.g., companies or other organizations) that may be willing to share information related to common vendors. All of these computational instances may be within the same or different data centers.

Unlike the arrangement of FIG. 6A in which there are one or more designated producers of information (e.g., provider instance 602) and one or more designated consumers of information (e.g., recipient instances 606A, 606B, 606C), the architecture of FIG. 6B allows any recipient instance to also be a producer of information. Thus, for example, recipient instance 614A may provide information about vendors A and B to neutral instance 612, recipient instance 614B may provide information about vendors B and C to neutral instance 612, and recipient instance 614C may provide information about vendor C to neutral instance 612. Any of recipient instances 614A, 614B, 614C may obtain this information.

In this way, recipient instances may obtain qualitative and/or quantitative assessments of various vendors to determine whether they should engage with these vendors or continue to engage with these vendors. As an example, an entity associated with recipient instance 614A may be curious about what other entities have reported regarding vendor C. The entity may, by way of recipient instance 614A, access information regarding vendor C that is stored in neutral instance 612. This data may have been deposited therein by recipient instances 614B and 614C. In this fashion, recipient instance 614A may conduct a more informed risk assessment for vendor C and will have access to a richer set of information for initial contact with and evaluation of vendor C In some embodiments, administrators of the remote network management platform may establish a database schema and security policy to support this form of access. For instance, the database schema and security policy may permit any of recipient instances 614A, 614B, 614C to report on a particular vendor, edit their own reports, and to be able to read the reports of another one of recipient instances 614A, 614B, 614C. This may be enabled by way of REST interfaces (or other types of interfaces) in accordance with the discussion above.

In some embodiments, the provided information may be sanitized to avoid disclosing proprietary, private, or sensitive data from recipient instances 614A, 614B, 614C. For example, user names, phone numbers, social security numbers, addresses, ages, URLs, IP addresses, and/or device names may be replaced with random strings or omitted entirely from the information provided to neutral instance 612. Further, information that identifies contracts, business relationships, financial data and transactions, software or hardware assets, and/or audit processes or results may also be obscured or omitted.

Additionally, to the extent that recipient instances 614A, 614B, 614C already maintain metrics related to vendors (e.g., SLA compliance, MTTR, etc.), these metrics may be automatically provided to neutral instance 612 if permitted by recipient instances 614A, 614B, 614C. Thus, the information stored in neutral instance 612 may include objective data as well as any subjective evaluations of vendors. In some embodiments, one or more of recipient instances 614A, 614B, 614C may agree to provide these metrics periodically or from time to time, such as once per week, once per month, once per quarter, or at irregular intervals.

As a consequence of the embodiments illustrated in FIGS. 6A and 6B, the multi-instance remote network management platform architecture can be extended and utilized for various types of data sharing between computational instances. The discussion so far focuses on the benefits of a neutral instance facilitating this communication. Indeed, by allowing a neutral instance to act as an intermediary in this fashion, the number of communication paths between n computational instances is on the order of n, rather than on the order of $n^2$. Thus, the number of security associations between pairs computational instances is also on the order of n, rather than on the order of $n^2$. As a consequence, the communication is simpler to facilitate, and the configuration thereof is more efficient. Nonetheless, direct communication between provider and/or recipient computational instances may also be possible in some environments.

Another advantage of the architecture described herein is that it allows the use of a producer/consumer (provider/recipient) model of data transfer. Namely, one or more producer (provider) instances securely publish information to a particular location of the neutral instance (e.g., a URL). One or more consumer (recipient) instances may subscribe to information published at the particular location. This subscription may entail the consumer instances agreeing to be notified by the neutral instance when the published information is updated or new information is published at the location. Thus, consumer instances may be triggered to obtain the updated information from the location. Access to the information can occur in various ways, e.g., by way of asynchronous REST or SOAP interfaces.

Figure 7:
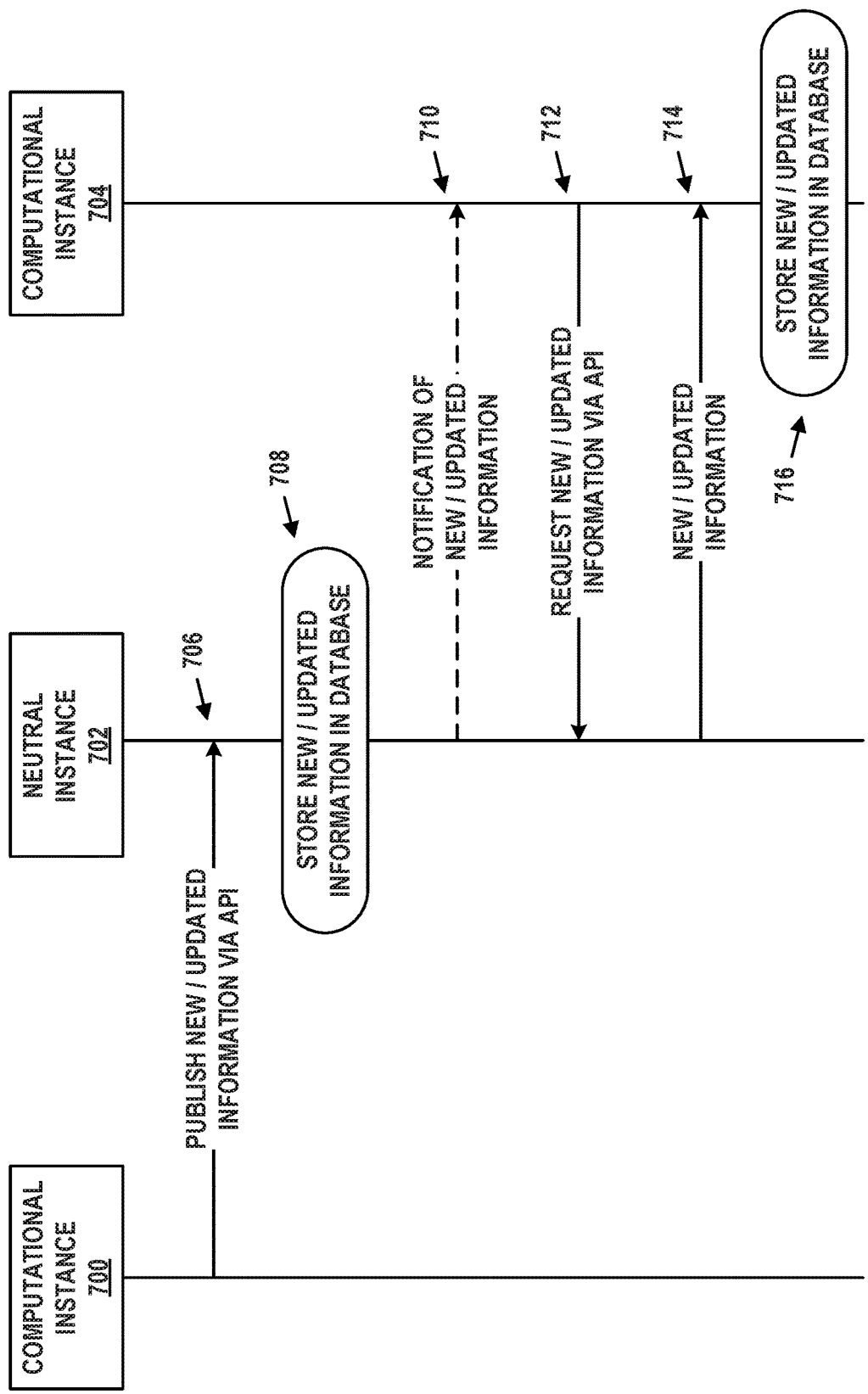
FIG. 7 depicts a message flow, in accordance with example embodiments.

FIG. 7 depicts a message flow diagram illustrating such a producer/consumer paradigm. In this example, computational instance 700 is the producer, computational instance 704 is the consumer, and communication between these computational instances is facilitated by neutral instance 702.

At step 706, computational instance 700 transmits a message to neutral instance 702. This message effectively publishes new or updated information by way of an API on neutral instance 702. For example, computational instance 700 may update its lists of offered goods and/or services in this fashion. At step 708, neutral instance 702 stores the new or updated information in a database.

The storage of the new or updated information in the database may trigger neutral instance 702 to transmit a notification to any computational instances that have subscribed to this particular information. For example, computational instance 704 may have entered into a communicative transaction with neutral instance 702 (not shown) that grants neutral instance 702 permission to notify computational instance 704 when the particular information is added or updated. This may involve computational instance 704 subscribing to any updates to a database, any updates to a particular table within the database, any updates to a particular field within the table, and so on.

Thus, at step 710, neutral instance 702 transmits a notification to computational instance 704. The notification may indicate that the new or updated information is available at neutral instance 702, and may optionally include a URL or API call by which the information can be accessed. Step 710 is depicted with a dotted line because it is not a required step, as computational instances may be configured to poll neutral instance 702 at regular or irregular intervals instead of or in addition to waiting for notifications.

To that point, at step 712, computational instance 704 transmits a request for the new or updated information to neutral instance 702. The transmission of this request may be triggered by computational instance 704 receiving the notification of step 710, by a time expiring, or by some other mechanism.

At step 714, neutral instance 702 transmits a representation of the new or updated information to computational instance 704. Then, at step 716, computational instance 704 may store some or all of this representation, or a transformed version thereof, in a database.

In this way, the unique architecture of a multi-instance remote network management platform can be improved to support secure, private, direct or indirect inter-instance communication. In doing so, entities making use of computational instances can employ information otherwise only available to other such entities and thus avoid redundant data collection and analysis procedures.

VI. Example Operations

Figure 8:
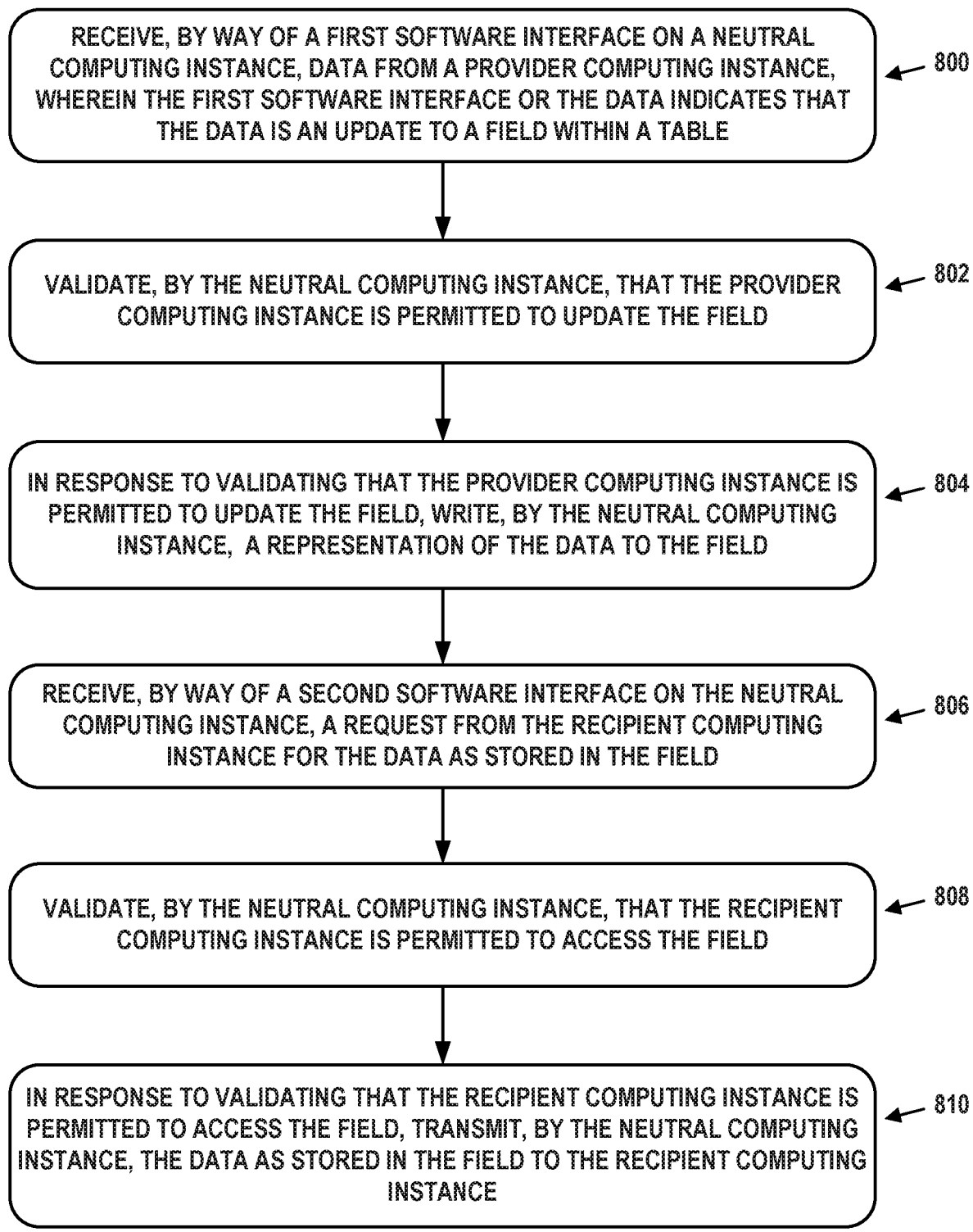
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve receiving, by way of a first software interface on a neutral computing instance, data from a provider computing instance, where the first software interface or the data indicates that the data is an update to a field within a table. In some embodiments, a remote network management platform includes: (i) the provider computing instance disposed upon hardware dedicated to a first entity, (ii) a recipient computing instance disposed upon hardware dedicated to a second entity, and (iii) the neutral computing instance including one or more processors and persistent storage. The neutral computing instance may be disposed upon hardware that is dedicated to neither the first entity nor the second entity. The persistent storage may define the table and fields therein.

Block 802 may involve validating, by the neutral computing instance, that the provider computing instance is permitted to update the field.

Block 804 may involve, possibly in response to validating that the provider computing instance is permitted to update the field, writing, by the neutral computing instance, a representation of the data to the field.

Block 806 may involve receiving, by way of a second software interface on the neutral computing instance, a request from the recipient computing instance for the data as stored in the field.

Block 808 may involve validating, by the neutral computing instance, that the recipient computing instance is permitted to access the field.

Block 810 may involve, in response to validating that the recipient computing instance is permitted to access the field, transmitting, by the neutral computing instance, the data as stored in the field to the recipient computing instance.

In some embodiments, only the provider computing instance is permitted to update the field, and where the recipient computing instance has read-only access to the field.

A second recipient computing instance may be disposed upon hardware dedicated to a third entity, and some embodiments may further involve: (i) receiving, by way of the second software interface, a second request from the second recipient computing instance for the data as stored in the field, (ii) validating that the second recipient computing instance is permitted to access the field, and (iii) possibly in response to validating that the second recipient computing instance is permitted to access the field, transmitting the data as stored in the field to the second recipient computing instance.

Some embodiments may further involve, possibly in response to writing the representation of the data to the field, transmitting a notification to the recipient computing instance indicating that the field has been updated. Receipt of the notification may cause the recipient computing instance to transmit the request for the data as stored in the field.

In some embodiments, the provider computing instance is permitted to create and delete tables within the persistent storage. In some embodiments, the provider computing instance and the recipient computing instance are both permitted to update the table.

Some embodiments may further involve: (i) receiving, by way of a third software interface on the neutral computational instance, second data from the recipient computing instance, where the third software interface or the second data indicates that the second data is an update a second field within the table, (ii) validating that the recipient computing instance is permitted to update the second field, (iii) possibly in response to validating that the recipient computing instance is permitted to update the second field, writing a representation of the second data to the second field, (iv) receiving, by way of a fourth software interface on the neutral computational instance, a second request from the provider computing instance for the second data as stored in the second field, (v) validating that the provider computing instance is permitted to access the second field, and (vi) possibly in response to validating that the provider computing instance is permitted to access the second field, transmitting the second data as stored in the second field to the provider computing instance.

In some embodiments, the first software interface is different from the second software interface. In some embodiments, the first software interface and the second software interface are REST or SOAP interfaces. In some embodiments, the first software interface and the second software interface provide access to the table the field by way of respective URLs.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A remote network management platform comprising:
a provider computing instance disposed upon hardware dedicated to a first entity;
a recipient computing instance disposed upon hardware dedicated to a second entity, wherein each of the provider computing instance and the recipient computing instance represent one or more server devices, one or more databases, or both, configured to provide a set of web portals, services, and applications; and
a neutral computing instance including one or more processors and persistent storage, wherein the persistent storage stores a table comprising a plurality of fields, wherein the neutral computing instance is disposed upon hardware that is dedicated to neither the first entity nor the second entity, wherein each of the provider computing instance, the recipient computing instance, and the neutral computing instance are logically and physically separate from one another, wherein the provider computing instance and the recipient computing instance are configured to exchange data via the table of the neutral computing instance rather than directly with one another, and wherein the neutral computing instance is configured to:
receive, from the provider computing instance, by way of a first software interface, a request to create the table and the plurality of fields of the table;
validate that the provider computing instance is permitted to create the table;
in response to validating that the provider computing instance is permitted to create the table, create the table in the persistent storage;
receive, by way of the first software interface, a set of data from the provider computing instance, wherein the first software interface or the set of data indicates that the set of data is an update to a field of the plurality of fields within the table;
validate that the provider computing instance is permitted to update the field;
in response to validating that the provider computing instance is permitted to update the field, write a representation of the set of data to the field;
receive, by way of a second software interface, a request from the recipient computing instance to access the set of data as stored in the field;
validate that the recipient computing instance is permitted to access the field; and
in response to validating that the recipient computing instance is permitted to access the field, transmit the set of data as stored in the field to the recipient computing instance.

2. The remote network management platform of claim 1, wherein only the provider computing instance is permitted to update the field, and wherein the recipient computing instance has read-only access to the field.

3. The remote network management platform of claim 1, comprising:
a second recipient computing instance disposed upon hardware dedicated to a third entity, wherein the neutral computing instance is configured to:
receive, by way of the second software interface, a second request from the second recipient computing instance for the set of data as stored in the field;
validate that the second recipient computing instance is permitted to access the field; and
in response to validating that the second recipient computing instance is permitted to access the field, transmit the set of data as stored in the field to the second recipient computing instance.

4. The remote network management platform of claim 1, wherein the neutral computing instance is configured to:
in response to writing the representation of the set of data to the field, transmit a notification to the recipient computing instance indicating that the field has been updated, wherein receipt of the notification causes the recipient computing instance to transmit the request for the set of data as stored in the field.

5. The remote network management platform of claim 1, wherein the provider computing instance is permitted to delete tables within the persistent storage.

6. The remote network management platform of claim 1, wherein the provider computing instance and the recipient computing instance are both permitted to update the table.

7. The remote network management platform of claim 1, wherein the neutral computing instance is configured to:
receive, by way of a third software interface, a second set of data from the recipient computing instance, wherein the third software interface or the second set of data indicates that the second set of data is an update to a second field of the plurality of fields within the table;

validate that the recipient computing instance is permitted to update the second field;

in response to validating that the recipient computing instance is permitted to update the second field, write a representation of the second set of data to the second field;

receive, by way of a fourth software interface, a second request from the provider computing instance to access the second set of data as stored in the second field;

validate that the provider computing instance is permitted to access the second field; and in response to validating that the provider computing instance is permitted to access the second field, transmit the second set of data as stored in the second field to the provider computing instance.

8. The remote network management platform of claim 1, wherein the first software interface is different from the second software interface.

9. The remote network management platform of claim 1, wherein the first software interface and the second software interface are representational state transfer (REST) or simple object access protocol (SOAP) interfaces.

10. The remote network management platform of claim 1, wherein validating that the provider computing instance is permitted to update the field comprises validating that the provider computing instance is permitted to write to the field.

11. The remote network management platform of claim 1, comprising an Application Platform as a Service (aPaaS) system, wherein the aPaaS system is configured to provide the set of web portals, services, and applications to the provider computing instance and the recipient computing instance via the one or more server devices, the one or more databases, or both.

12. The remote network management platform of claim 11, wherein the aPaaS system is configured to support development and execution of model-view-controller (MVC) applications, and wherein the MVC applications comprise web-based applications configured to provide create, read, update, and delete (CRUD) capabilities.

13. A computer-implemented method, wherein a remote network management platform includes (i) a provider computing instance disposed upon hardware dedicated to a first entity, (ii) a recipient computing instance disposed upon hardware dedicated to a second entity, and (iii) a neutral computing instance including one or more processors and persistent storage, wherein the persistent storage stores a table comprising a plurality of fields, wherein the neutral computing instance is disposed upon hardware that is dedicated to neither the first entity nor the second entity, wherein each of the provider computing instance and the recipient computing instance represent one or more server devices, one or more databases, or both, configured to provide a set of web portals, services, and applications, wherein each of the provider computing instance, the recipient computing instance, and the neutral computing instance are logically and physically separate from one another, wherein the provider computing instance and the recipient computing instance are configured to exchange data via the table of the neutral computing instance rather than directly with one another, the computer-implemented method comprising:

receiving, by way of a first software interface on the neutral computing instance, a set of data from the provider computing instance, wherein the first software interface or the set of data indicates that the set of data is an update to a field of the plurality of fields within the table;

validating, by the neutral computing instance, that the provider computing instance is permitted to update the field;

in response to validating that the provider computing instance is permitted to update the field, writing, by the neutral computing instance, a representation of the set of data to the field;

receiving, by way of a second software interface on the neutral computing instance, a request from the recipient computing instance to access the set of data as stored in the field;

validating, by the neutral computing instance, that the recipient computing instance is permitted to access the field;

in response to validating that the recipient computing instance is permitted to access the field, transmitting, by the neutral computing instance, the set of data as stored in the field to the recipient computing instance;

receiving, from the recipient computing instance, by way of the second software interface on the neutral computing instance, assessment data associated with the first entity, wherein the assessment data is associated with one or more services, one or more products, or both, provided by the first entity;

in response to receiving the assessment data associated with the first entity, storing, by the neutral computing instance, the assessment data in the persistent storage;

receiving, from a second recipient computing instance associated with a third entity, by way of the second software interface on the neutral computing instance, a request for the assessment data associated with the first entity; and in response to receiving the request from the second recipient computing instance, providing, by the neutral computing instance, the assessment data to the second recipient computing instance.

14. The computer-implemented method of claim 13, wherein only the provider computing instance is permitted to update the field, and wherein the recipient computing instance has read-only access to the field.

15. The computer-implemented method of claim 13, wherein the second recipient computing instance is disposed upon hardware dedicated to the third entity, the computer-implemented method comprising:

receiving, by way of the second software interface, a second request from the second recipient computing instance to access the set of data as stored in the field;

validating that the second recipient computing instance is permitted to access the field; and in response to validating that the second recipient computing instance is permitted to access the field, transmitting the set of data as stored in the field to the second recipient computing instance.

16. The computer-implemented method of claim 13, wherein the provider computing instance and the recipient computing instance are both permitted to update the table.

17. The computer-implemented method of claim 13, the computer-implemented method comprising:

receiving, by way of a third software interface on the neutral computing instance, a second set of data from the recipient computing instance, wherein the third software interface or the second set of data indicates that the second set of data is an update to a second field of the plurality of fields within the table;

validating that the recipient computing instance is permitted to update the second field;

in response to validating that the recipient computing instance is permitted to update the second field, writing a representation of the second set of data to the second field;

receiving, by way of a fourth software interface on the neutral computing instance, a second request from the provider computing instance to access the second set of data as stored in the second field;

validating that the provider computing instance is permitted to access the second field; and in response to validating that the provider computing instance is permitted to access the second field, transmitting the second set of data as stored in the second field to the provider computing instance.

18. An article of manufacture including a non-transitory computer-readable medium, wherein a remote network management platform includes (i) a provider computing instance disposed upon hardware dedicated to a first entity, (ii) a recipient computing instance disposed upon hardware dedicated to a second entity, and (iii) a neutral computing instance including one or more processors and persistent storage, wherein the persistent storage stores a table comprising a plurality of fields, wherein the neutral computing instance is disposed upon hardware that is dedicated to neither the first entity nor the second entity, wherein each of the provider computing instance and the recipient computing instance represent one or more server devices, one or more databases, or both, configured to provide a set of web portals, services, and applications, wherein each of the provider computing instance, the recipient computing instance, and the neutral computing instance are logically and physically separate from one another, wherein the provider computing instance and the recipient computing instance are configured to exchange data via the table of the neutral computing instance rather than directly with one another, the non-transitory computer-readable medium having stored thereon program instructions that, upon execution by the neutral computing instance, cause the neutral computing instance to perform operations comprising:

receiving, by way of a first software interface on the neutral computing instance, a set of data from the provider computing instance, wherein the first software interface or the set of data indicates that a set of data is an update to a field of the plurality of fields within the table, and wherein the first software interface comprises a representational state transfer (REST) interface or a simple object access protocol (SOAP) interface configured to enable the provider computing instance to update the field by way of an HTTP POST command, an HTTP GET command, an HTTP DELETE command, or an HTTP PUT command, or a combination thereof;

validating that the provider computing instance is permitted to update the field;

in response to validating that the provider computing instance is permitted to update the field, writing a representation of the set of data to the field;

receiving, by way of a second software interface on the neutral computing instance, a request from the recipient computing instance to access the set of data as stored in the field, wherein the second software interface comprises an additional REST interface or an additional SOAP interface configured to enable the recipient computing instance to access the field by way of an additional HTTP GET command;

validating that the recipient computing instance is permitted to access the field; and in response to validating that the recipient computing instance is permitted to access the field, transmitting the set of data as stored in the field to the recipient computing instance.

19. The article of manufacture of claim 18, wherein a second recipient computing instance disposed upon hardware dedicated to a third entity, the operations comprising:

receiving, by way of the second software interface, a second request from the second recipient computing instance for the set of data as stored in the field;

validating that the second recipient computing instance is permitted to access the field; and in response to validating that the second recipient computing instance is permitted to access the field, transmitting the set of data as stored in the field to the second recipient computing instance.

20. The article of manufacture of claim 18, the operations comprising:

receiving, by way of a third software interface on the neutral computing instance, a second set of data from the recipient computing instance, wherein the third software interface or the second set of data indicates that the second set of data is an update to a second field within the table;

validating that the recipient computing instance is permitted to update the second field;

in response to validating that the recipient computing instance is permitted to update the second field, writing a representation of the second set of data to the second field;

receiving, by way of a fourth software interface on the neutral computing instance, a second request from the provider computing instance for the second set of data as stored in the second field;

validating that the provider computing instance is permitted to access the second field; and in response to validating that the provider computing instance is permitted to access the second field, transmitting the second set of data as stored in the second field to the provider computing instance.

* * * * *